United States Patent
Funk et al.

(10) Patent No.: US 11,002,245 B2
(45) Date of Patent: May 11, 2021

(54) AGRICULTURAL MACHINE WITH A HYDRAULICALLY DRIVEN GENERATOR

(71) Applicant: Deere & Company, Moline, IL (US)

(72) Inventors: Eric R. Funk, Apex, NC (US);
Randall A. Maro, Davenport, IA (US);
David J. Rylander, Moline, IL (US)

(73) Assignee: Deere & Company

( * ) Notice: Subject to any disclaimer, the term of this patent is extended or adjusted under 35 U.S.C. 154(b) by 633 days.

(21) Appl. No.: 15/822,494

(22) Filed: Nov. 27, 2017

(65) Prior Publication Data
US 2019/0162164 A1    May 30, 2019

(51) Int. Cl.
| | |
|---|---|
| *F01B 23/10* | (2006.01) |
| *F03C 1/40* | (2006.01) |
| *A01C 7/08* | (2006.01) |
| *A01C 7/20* | (2006.01) |
| *H02K 7/18* | (2006.01) |
| *A01B 76/00* | (2006.01) |
| *H02P 9/06* | (2006.01) |
| *H02P 9/04* | (2006.01) |

(52) U.S. Cl.
CPC ............ *F03C 1/0697* (2013.01); *A01B 76/00* (2013.01); *A01C 7/08* (2013.01); *A01C 7/20* (2013.01); *F01B 23/10* (2013.01); *F03C 1/0692* (2013.01); *H02K 7/1807* (2013.01); *H02P 9/04* (2013.01); *H02P 9/06* (2013.01)

(58) Field of Classification Search
CPC .. A01B 76/00; A01C 7/08; A01C 7/20; F03C 1/0697; F03C 1/0689; F01B 23/10; F01B 3/007
See application file for complete search history.

(56) References Cited

U.S. PATENT DOCUMENTS

| | | | | |
|---|---|---|---|---|
| 4,939,954 | A | * | 7/1990 | Walzer ................. B60W 30/18 477/68 |
| 5,070,695 | A | * | 12/1991 | Metzner ................. F04B 49/06 60/448 |
| 2009/0134848 | A1 | * | 5/2009 | Boisvert ................. F16H 61/47 322/38 |
| 2013/0248212 | A1 | | 9/2013 | Bassett |
| 2013/0257049 | A1 | | 10/2013 | Taylor et al. |
| 2014/0048002 | A1 | | 2/2014 | Grimm et al. |
| 2015/0147191 | A1 | | 5/2015 | Heathcoat, Jr. et al. |

OTHER PUBLICATIONS

European Application No. 18201859.8 EP Search Report dated May 3, 2019, 7 pages.

* cited by examiner

*Primary Examiner* — Abiy Teka
(74) *Attorney, Agent, or Firm* — Joseph R. Kelly; Kelly, Holt & Christenson PLLC (57) ABSTRACT

A hydraulic motor assembly includes a flow controller, a displacement controller and a hydraulic motor. The flow controller controls the flow of hydraulic fluid through the hydraulic motor and the displacement controller controls motor displacement. The hydraulic motor converts the pressure and flow into angular displacement of a drive shaft. An electrical generator is connected to the motor drive shaft and provides electrical power to accommodate a varying electrical load. As the electrical load varies, the flow controller and displacement controller vary the flow and displacement of the hydraulic motor to vary the torque applied to the generator by the drive shaft so that the drive shaft rotates at a desired speed.

20 Claims, 5 Drawing Sheets

AGRICULTURAL MACHINE WITH A HYDRAULICALLY DRIVEN GENERATOR

FIELD OF THE DESCRIPTION

The present description relates to generating power on an implement. More specifically, the present description relates to driving an electric generator with a hydraulic motor on a towed agricultural implement.

BACKGROUND

There are many different types of agricultural machines. Some machines are self-propelled machines, while others are towed by a towing vehicle. Some towed implements have electric motors or electric actuators that need to be powered.

In order to power electric actuators or electric motors on a towed implement, it is not uncommon for the electric motor or electric actuator to receive a power source from the towing vehicle. For instance, some electric actuators or electric motors are powered from an electrical system on the towing vehicle.

The discussion above is merely provided for general background information and is not intended to be used as an aid in determining the scope of the claimed subject matter.

SUMMARY

A hydraulic motor assembly includes a flow controller, a displacement controller and a hydraulic motor. The flow controller controls the flow of hydraulic fluid through the hydraulic motor and the displacement controller controls motor displacement. The hydraulic motor converts the pressure and flow into angular displacement of a drive shaft. An electrical generator is connected to the drive shaft of the motor and provides electrical power to accommodate a varying electrical load. As the electrical load varies, the flow controller and displacement controller vary the flow and displacement of the hydraulic motor to vary the torque applied to the generator by the drive shaft so that the drive shaft rotates at a desired speed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

As briefly mentioned above, some towed agricultural implements have motors or actuators that are electrically driven. Therefore, those actuators or motors must be powered by a source of electrical power. The electrical power requirements may sometimes exceed what is available for supply by the electrical system of the towing vehicle (e.g., by the electrical system of a tractor).

In addition, it is often difficult to transfer mechanical power from the towing vehicle to the towed implement, in order to, for instance, turn a rotor (such as an alternator) on an electrical generator. Thus, hydraulic fluid under pressure, from the hydraulic system on the towing vehicle, may be provided to turn a hydraulic motor on the towed implement which, in turn, spins or turns the rotor. The electrical load of electric components on some towed agricultural implements may vary greatly (such as from needing substantially no power, to needing the maximum that the electrical generator can generate). Therefore, the load on the hydraulic motor will also vary greatly.

However, generators (or alternators) often operate best when they spin at a constant speed (or at a speed within a relatively narrow speed range). Thus, in one example, the output drive shaft of any hydraulic motor that is provided to turn the generator would also need to spin at a substantially fixed speed (or within a relatively narrow speed range), assuming that there is a fixed ratio between the drive shaft of the hydraulic motor and the generator.

Most towing vehicles do not have a dedicated hydraulic pump to provide the function of driving this type of hydraulic motor. Therefore, the hydraulic pump in the towing vehicle's hydraulic system that provides fluid under pressure to the hydraulic motor on the towed agricultural implement will also likely have other functions on the towing agricultural vehicle (or on the towed agricultural implement) that may be running off of that same pump. Those other functions may need the pump to run at high pressures.

Therefore, if a fixed displacement hydraulic motor is used for turning a rotor on an electrical generator on the towed agricultural implement, the flow would then be relatively constant along with a constant pressure input. This would result in a power input into the electrical generator that has a maximum torque, to ensure that it can spin the generator at the desired speed, even at the highest loads on the electrical generator. If the electrical load on the generator was relatively low, however, this results in the hydraulic motor assembly being required to dissipate most of the input energy. This is often dissipated as heat, and it may result in more heat than most towing vehicle cooling systems can accommodate.

The present description thus utilizes a variable displacement motor that allows a variable flow rate so that the power output by the system can vary based on the torque required by the system which, in turn, varies based upon the electrical load on the generator. This greatly enhances the hydraulic system efficiency, and it greatly reduces any need to dissipate excess energy in the hydraulic system of the towing agricultural vehicle. The present discussion contemplated using either a variable displacement fixed speed or a variable displacement variable speed hydraulic motor.

Figure 1:
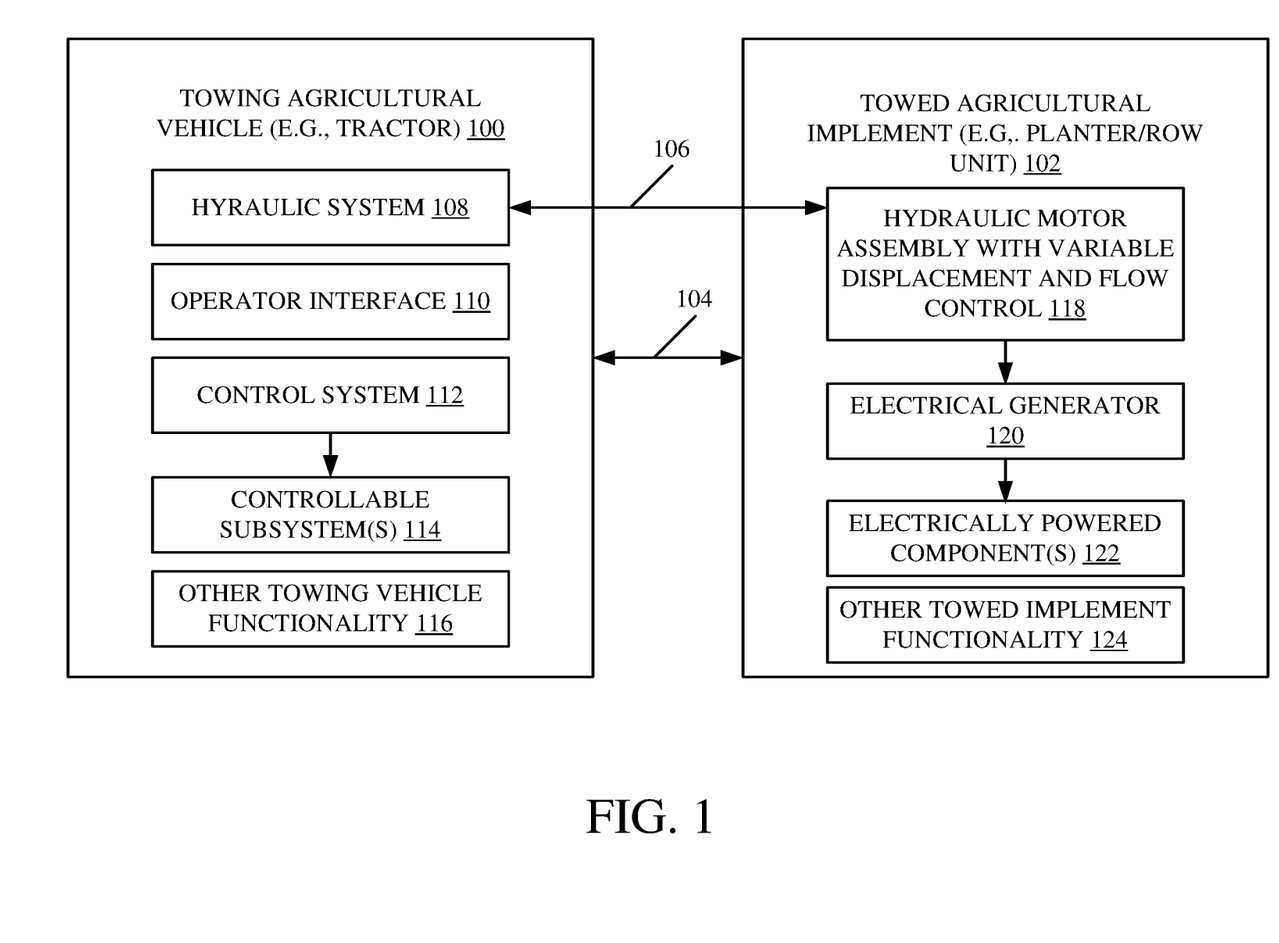
FIG. 1 is a block diagram of one example of a towing agricultural vehicle and a towed implement.

FIG. 1 is a block diagram showing one example of a towing agricultural vehicle (e.g., a tractor) 100 which is coupled to a towed agricultural implement 102 by a link 104.

Link 104 can be a mechanical link, and it can also include an electrical link, or other types of links. Towing vehicle 100 is also illustratively connected to provide hydraulic fluid under pressure to towed agricultural implement 102 over a hydraulic link 106.

In the example shown in FIG. 1, towing agricultural vehicle 100 illustratively includes a hydraulic system 108 that may be powered by an engine or other part of towing agricultural vehicle 100, and that provides hydraulic fluid under pressure for carrying out a variety of different hydraulic functions or for powering a variety of different hydraulic actuators. Vehicle 100 also illustratively includes operator interface 110, control system 112, one or more controllable subsystems 114, and it can include a wide variety of other towing vehicle functionality 116.

Operator interface 110 can take a wide variety of different forms. For instance, it can include output mechanisms such as a display screen, audio and haptic output mechanisms, among other things. It can also include input mechanisms, such as levers, steering wheels, pedals, joysticks, touch sensitive screens with user actuatable icons or buttons or other elements, a speech recognition system for receiving voice commands, among a wide variety of other things. Control system 112 can include a processor and memory along with logic to receive operator inputs through operator interface 110, and it can also receive a wide variety of other inputs, such as sensor inputs from a variety of different sensors, or other inputs, and generate control signals to control one or more controllable subsystems 114. Controllable subsystems 114 can include a propulsion and steering system, as well as a wide variety of other actuators or controllable subsystems. Towing agricultural vehicle 100 can also include a wide variety of other towing vehicle functionality 116.

In the example shown in FIG. 1, towed agricultural implement 102 can be a planter or a row unit of a planter, for example, or it can be a wide variety of other towed agricultural implements. It illustratively includes a hydraulic motor assembly 118 with variable displacement and flow control. It also illustratively includes electrical generator 120, electrically powered components 122, and it can include a wide variety of other towed implement functionality 124. In one example, the electrically powered components 122 can be a wide variety of different components, such as a seed metering system, a seed delivery system, or a wide variety of other electrically powered components.

Electrical generator 120 illustratively has a rotatable input (such as a rotor or an alternator) that can be driven by an output shaft (drive shaft) of hydraulic motor assembly 118 in order to generate electrical energy for the electrically powered components 122. Hydraulic motor assembly 118 illustratively receives hydraulic fluid under pressure through hydraulic link 106, which turns a pressure-to-torque actuator which drives angular displacement of a drive shaft (shown in FIG. 2). The drive shaft can be coupled to the rotor (e.g., the alternator) of electrical generator 120 to turn the generator so that it generates the desired electrical power for electrically powered components 122.

In one example, the hydraulic fluid under pressure received through link 106 is received at a relatively constant pressure. Thus, hydraulic motor assembly 118 is provided with variable displacement control and variable flow control so that the displacement and flow of hydraulic motor assembly 118 can be controlled to provide a rotation of its drive shaft so it rotates at a relatively constant speed (or at a controllable, variable speed), and a torque on the drive shaft that varies depending upon the torque needed to drive the rotor (or alternator) in electrical generator 120. The torque needed to drive the rotor may vary based upon the electrical load on electrical generator 120. Therefore, the torque output by hydraulic motor assembly 118 can be varied to meet the torque needed to drive the electrical generator 120. This greatly enhances the efficiency of the hydraulic system because hydraulic motor assembly 118 need not constantly provide power at its output to accommodate for maximum torque on its drive shaft. Instead, it may provide only the power needed at its output to accommodate for the torque needed, at the time, to drive the rotor of electrical generator 120. If the load on generator 120 is low, that torque needed to turn its rotor may be relatively low. If the load on generator 120 is high, the needed torque may be relatively high. The torque provided by the hydraulic motor assembly 118 thus illustratively varies with the load on generator 120.

Figure 2:
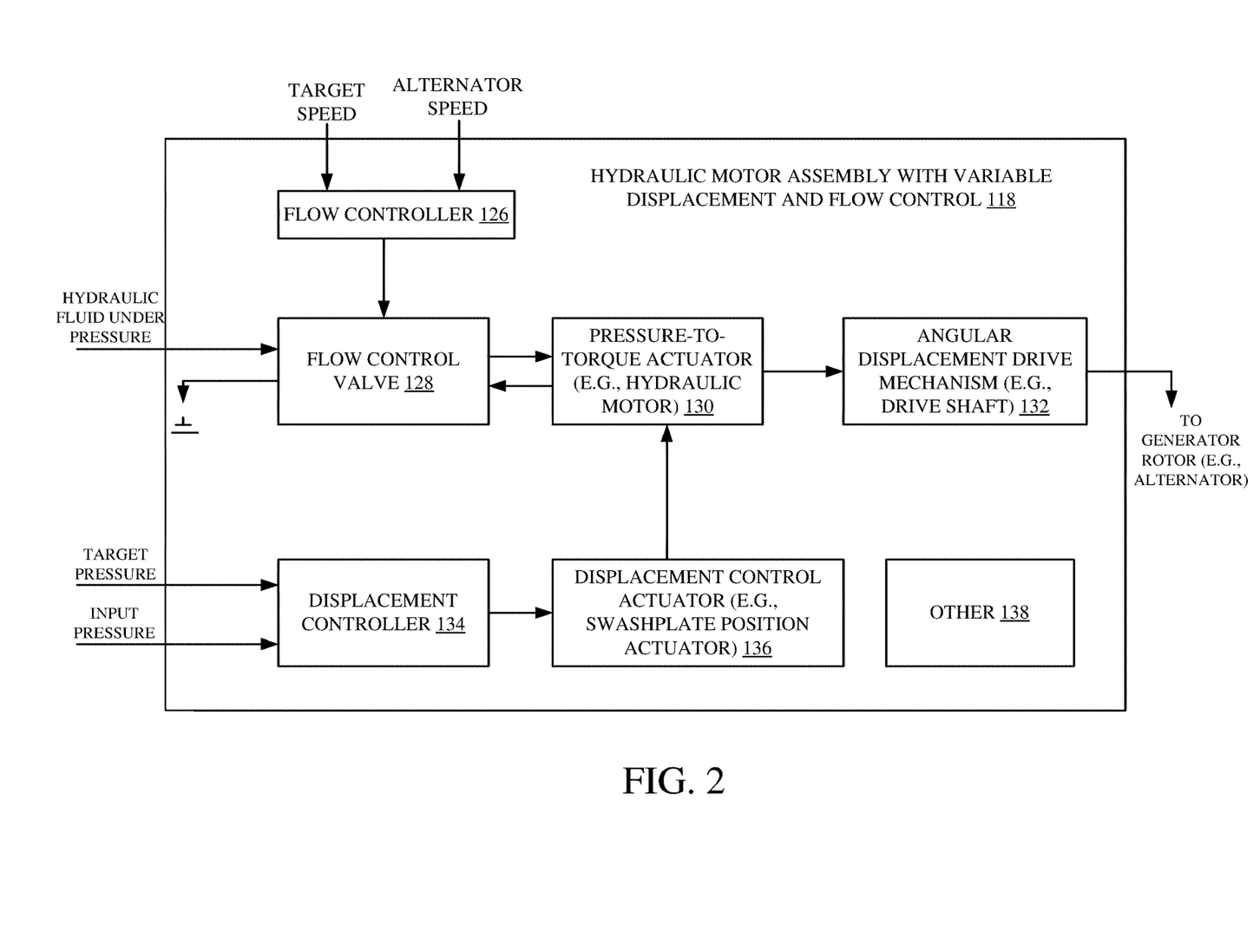
FIG. 2 is a block diagram showing one example of a hydraulic motor assembly in more detail.

FIG. 2 is a block diagram showing one example of hydraulic motor assembly 118, along with its variable displacement and flow control components. Some hydraulic schematic diagrams showing hydraulic motor assembly 118 are described in greater detail below with respect to FIGS. 3 and 4. Before describing those examples in more detail, however, an overview of the operation of portions of the hydraulic motor assembly 118, and their operation, will first be provided with respect to FIG. 2.

In the example shown in FIG. 2, hydraulic motor assembly 118 illustratively includes flow controller 126 (which can include a processor with memory and/or other logic), flow control valve 128, pressure-to-torque actuator (or hydraulic motor) 130, angular displacement drive mechanism (e.g., drive shaft) 132, displacement controller 134 (which can also include a processor with memory and/or other logic), displacement control actuator (e.g., a swashplate position actuator) 136, and it can include other items 138. Flow controller 126 illustratively receives a target speed and a rotor speed (e.g., an alternator speed). The rotor speed illustratively corresponds to the rotational speed of angular displacement drive mechanism (drive shaft) 132, assuming that there is a fixed gear ratio between drive shaft 132 and the rotor on electrical generator 120. The target speed is illustratively defined by a desired speed at which the rotor should be turning in order for electrical generator 120 to operate appropriately. Therefore, flow controller 126 illustratively compares the target speed to the rotor speed and controls a proportional valve which comprises flow control valve 128 in order to control the flow of hydraulic fluid under pressure into the pressure-to-torque actuator (or hydraulic motor) 130. Hydraulic motor 130 illustratively converts the flow and the hydraulic fluid under pressure into torque that can be exerted on drive shaft 132. Flow controller 126 illustratively controls flow control valve 128 in order to increase flow or decrease flow to keep the rotor speed within a predefined range of the target speed. For example, flow controller 126 controls the flow of hydraulic fluid under pressure to flow control valve 128 to increase if the rotational speed of drive shaft 132 is too low and to decrease if the speed of drive shaft 132 is too high. It will be noted that, while the present discussion proceeds with respect to maintaining the speed of drive shaft 132 at a relatively fixed speed, that speed can be varied as well.

Displacement controller 134 illustratively receives a target pressure and an input pressure. The input pressure is illustratively representative of the pressure of the hydraulic fluid under pressure that is provided to pressure-to-torque actuator 130 through flow control valve 128. The torque generated hydraulic motor 130 is illustratively a function of the displacement of by hydraulic motor 130 and the input pressure of the hydraulic fluid under pressure. In one example, the target pressure can be a variable that can be setup in displacement controller 134 that matches the pressure output by hydraulic system 108 of towing agricultural vehicle 100. In another example, the target pressure can be setup to substantially match the pressure of the hydraulic fluid provided to the input of hydraulic motor 130. Displacement controller 134 then controls the displacement control actuator 136 to change the displacement of hydraulic motor 130, based upon the differences between the input pressure and target pressure. If the input pressure to the hydraulic motor 130 is too high, then displacement controller 134 controls displacement control actuator 136 so that the hydraulic motor 130 goes further into stroke. If the pressure input to pressure-to-torque actuator 130 is too low, then displacement controller 134 controls displacement control actuator 136 so that hydraulic motor 130 comes further out of stroke.

Thus, flow controller 126 controls the speed of angular displacement drive mechanism (e.g., drive shaft) 132 and displacement controller 134 illustratively controls the displacement of hydraulic motor 130 to control the torque that can be applied by motor 130 to drive shaft 132.

Figure 3:
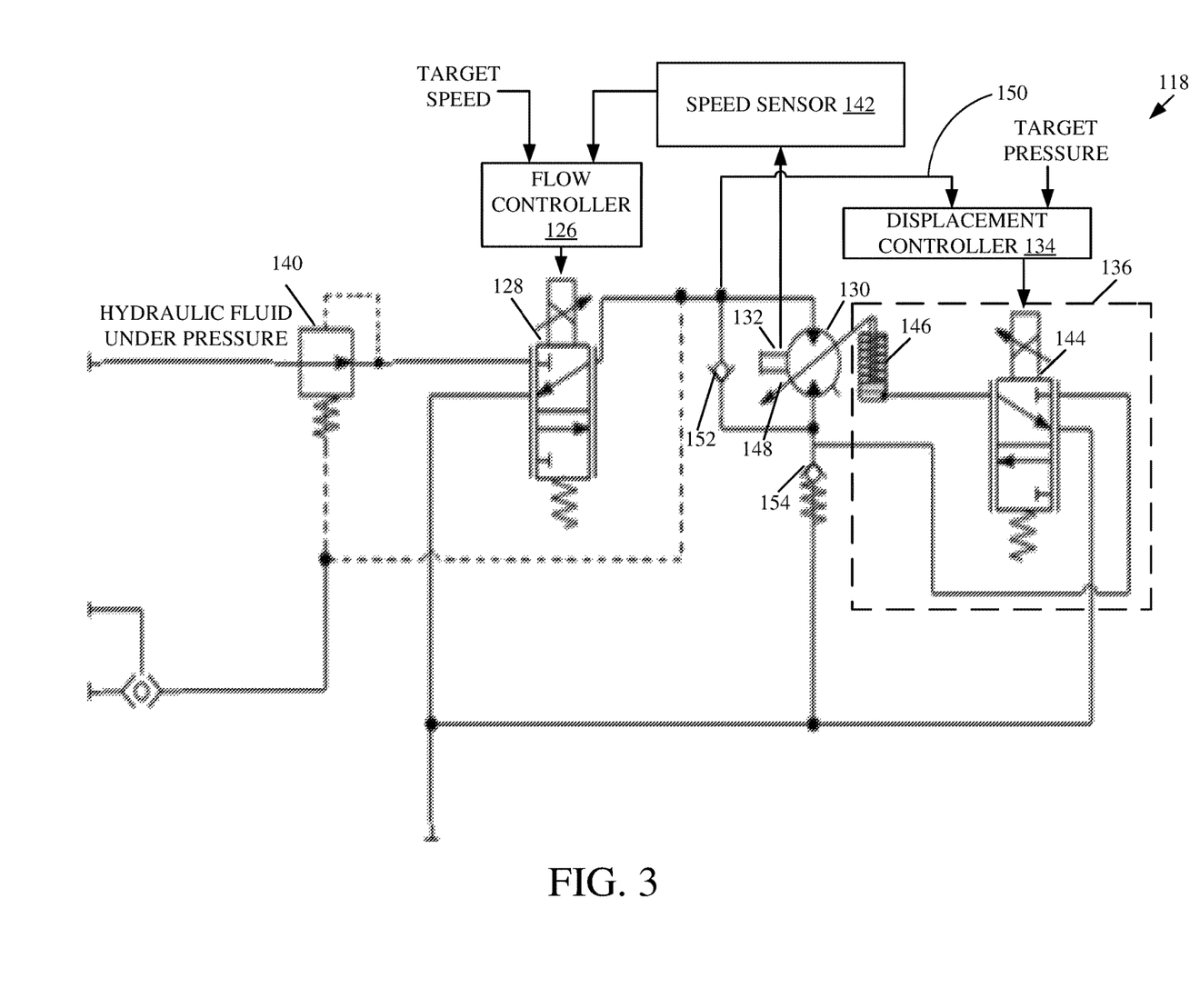
FIG. 3 is a partial block diagram, partial hydraulic schematic diagram showing the hydraulic motor assembly illustrated in FIG. 2, with externally controlled displacement, in more detail.

FIG. 3 is a partial block diagram, partial hydraulic schematic diagram of one example of hydraulic motor assembly 118. Some of the items shown in FIG. 3 are similar to those shown in FIG. 2, and they are similarly numbered. FIG. 3 shows that, in one example, hydraulic fluid under pressure is provided to hydraulic motor assembly 118 through pressure compensated valve 140. Pilot pressure to flow control valve 128 is provided by flow controller 126 which receives the target speed and rotor speed (or drive shaft speed) that may be sensed by a speed sensor 142. Therefore, if the speed of drive shaft 132 is too low, then flow controller 126 controls the pilot pressure to valve 128 to increase flow to motor 130. If the speed of drive shaft 132 is too high, then flow controller 126 generates a control signal to control the position of valve 128 to decrease flow to motor 130.

FIG. 3 also shows that displacement control actuator 136 illustratively includes displacement control valve 144 and compression spring assembly 146. Compression spring assembly 146 is coupled to swashplate 148.

In the example shown in FIG. 3, displacement controller 134 illustratively receives a signal 150 indicative of the pressure of hydraulic fluid under pressure provided to the input of motor 130. It also receives the target pressure and generates a control signal that is used to control valve 144 based upon a comparison between then input pressure to motor 130 and the target pressure. If the motor input pressure is too high, displacement controller 134 controls valve 144 to control the pressure applied to compression spring assembly 146 so that it moves swashplate 148 to increase the displacement of motor 130 (e.g., so that motor 130 goes further into stroke). On the other hand, if the input pressure is too low, then displacement controller 134 controls valve 144 to control the pressure applied to compression spring assembly 146 to decrease the displacement of motor 130 (e.g., so that motor 130 comes further out of stroke).

In the example shown in FIG. 3, check valves 152 and 154 are arranged to provide some back pressure on motor 130, even when it is off. This inhibits the pistons in motor 130 from lifting off of swashplate 148, even when motor 130 is off.

Figure 4:
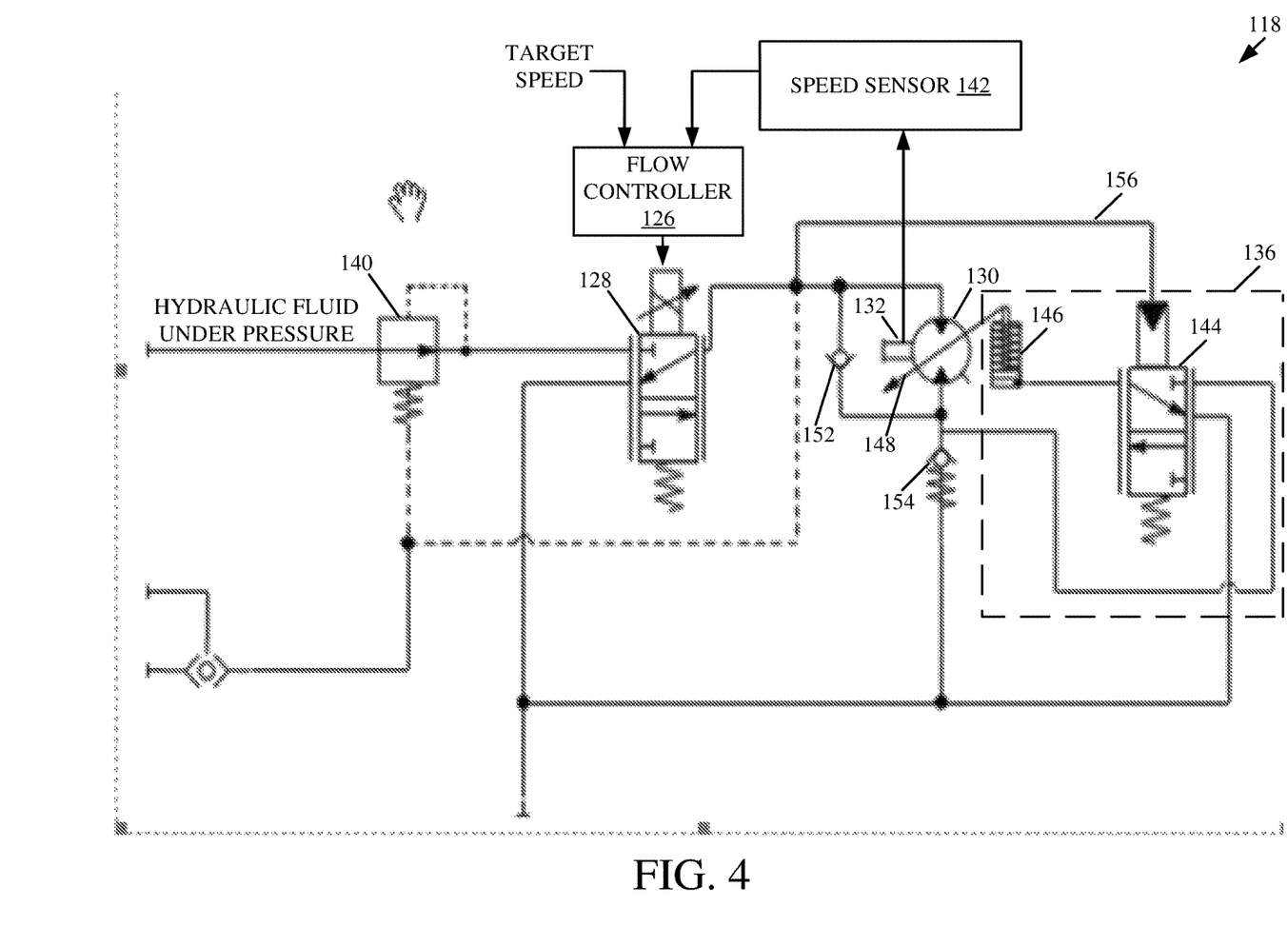
FIG. 4 is a partial block diagram, partial hydraulic schematic diagram illustrating one example of the hydraulic motor assembly shown in FIG. 2, with internal displacement control, in more detail.

FIG. 4 shows yet another example of hydraulic motor assembly 118. As with FIG. 3, FIG. 4 is a partial black diagram, partial hydraulic schematic diagram. Some items are similar to those shown in FIGS. 2 and 3, and they are similarly numbered. The operation of the example of hydraulic motor assembly 118 shown in FIG. 4 is similar to that shown in FIG. 3, except that displacement control valve 144 is now controlled by a pilot pressure which is the pressure of hydraulic fluid under pressure input to motor 130. That pressure is ported through pressure line 156 from the input side of motor 130 to the pilot pressure input on valve 144. Thus, valve 144 controls compression spring assembly 146 which, in turn, controls the position of swashplate 148 so that the displacement of motor 130 is controlled to match the input pressure. If the input pressure to motor 130 drops, the pilot pressure on valve 144 decreases, which causes compression spring assembly 146 to move actuator 148 to decrease the displacement of motor 130. If the input pressure to motor 130 increases, this will increase the pilot pressure applied to valve 144 which causes compression spring assembly 146 to move swashplate 148 to increase the displacement of motor 130.

Figure 5:
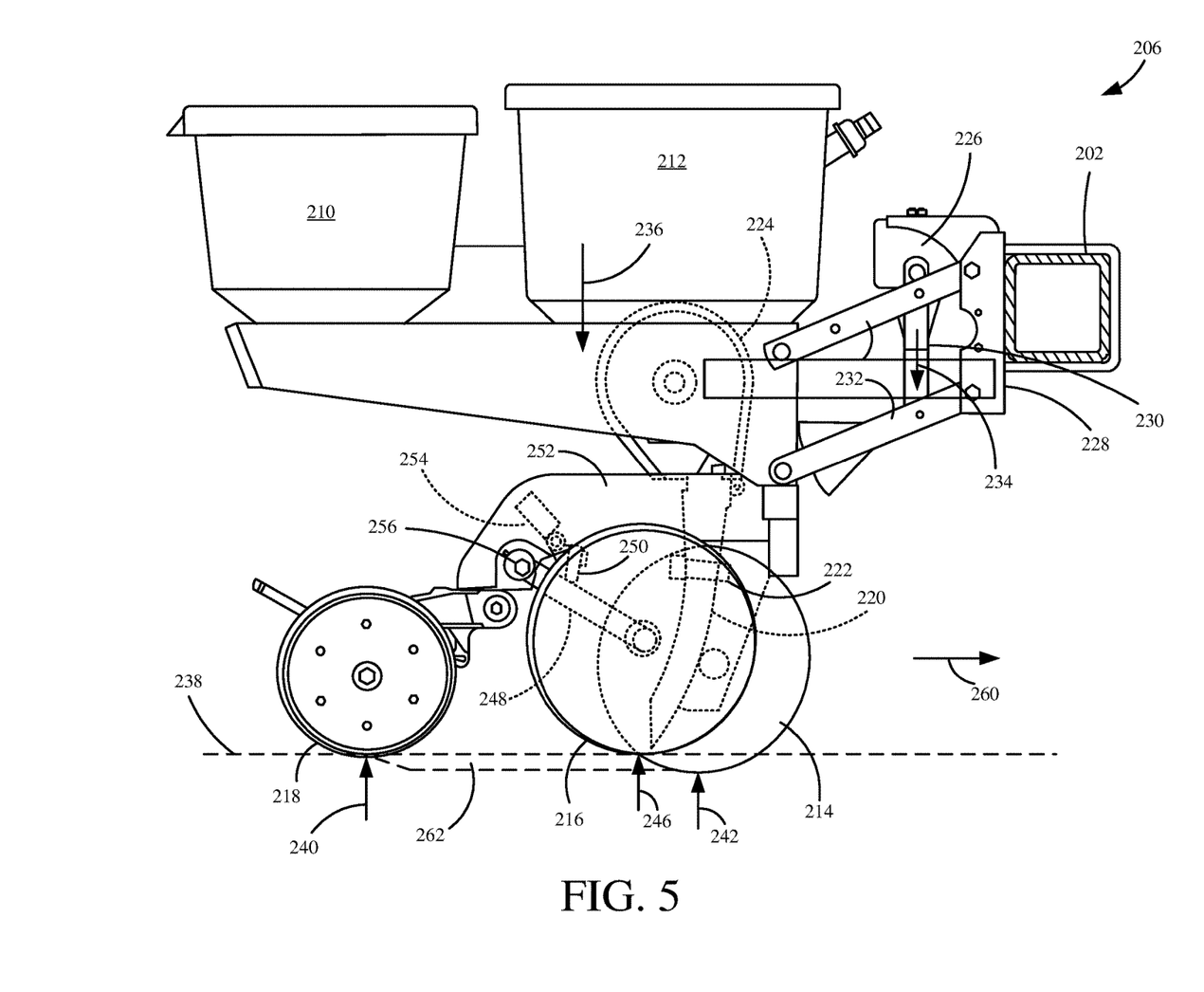
FIG. 5 shows one example in which the towed agricultural implement is a row unit of a planter.

FIG. 5 is a side view showing one example in which towed implement 102 is a row unit on a planter. Row unit 102 illustratively includes a chemical tank 210 and a seed storage tank 212. It also illustratively includes a disc opener 214, a set of gauge wheels 216, and a set of closing wheels 218. Seeds from tank 212 are fed by gravity into a seed meter 224. The seed meter can have an electrically powered motor that is powered by hydraulic motor assembly 118. The seed meter controls the rate at which seeds are dropped into a seed tube 220 or other seed delivery system, such as a brush belt, from seed storage tank 212. The seeds can be sensed by a seed sensor 222.

It will be noted that there are different types of seed meters, and the one that is shown is shown for the sake of example only. For instance, in one example, each row unit 102 need not have its own seed meter. Instead, metering or other singulation or seed dividing techniques can be performed at a central location, for groups of row units 102. The metering systems can have electronic motors that are electrically powered by assembly 118 and can include rotatable discs, rotatable concave or bowl-shaped devices, among others. The seed delivery system can be a gravity drop system (such as that shown in FIG. 5) in which seeds are dropped through the seed tube 220 and fall (via gravitational force) through the seed tube into the seed trench. Other types of seed delivery systems are assistive systems, in that they do not simply rely on gravity to move the seed from the metering system into the ground. Instead, such systems may have an electric motor (powered by assembly 118) that drives a capture device that actively captures the seeds from the seed meter and physically moves the seeds from the meter to a lower opening, where they exit into the ground or trench.

A downforce actuator 226 is mounted on a coupling assembly 228 that couples row unit 102 to toolbar 202. Actuator 226 can be a hydraulic actuator, a pneumatic actuator, an electrically controlled actuator, a spring-based mechanical actuator or a wide variety of other actuators. In the example shown in FIG. 5, a rod 230 is coupled to a parallel linkage 232 and is used to exert an additional downforce (in the direction indicated by arrow 234) on row unit 102. The total downforce (which includes the force indicated by arrow 234 exerted by actuator 226, plus the force due to gravity acting on row unit 102, and indicated by arrow 236) is offset by upwardly directed forces acting on closing wheels 218 (from ground 238 and indicated by arrow 240) and double disc opener 214 (again from ground 238 and indicated by arrow 242). The remaining force (the sum of the force vectors indicated by arrows 234 and 236, minus the force indicated by arrows 240 and 242) and the force on any other ground engaging component on the row unit (not shown), is the differential force indicated by arrow 246. The differential force may also be referred to herein as the downforce margin. The force indicated by arrow 246 acts on the gauge wheels 216. This load can be sensed by a gauge wheel load sensor which may be located anywhere on row unit 102 where it can sense that load. It can also be placed where it may not sense the load directly, but a characteristic indicative of that load. Both sensing the load directly or indirectly are contemplated herein and will be referred to as sensing a force characteristic indicative of that load (or force). For example, it can be disposed near a set of gauge wheel control arms (or gauge wheel arm) 248 that movably mount gauge wheels 216 to shank 252 and control an offset between gauge wheels 216 and the discs in double disc opener 214, to control planting depth. Arms (or gauge wheel arms) 248 illustratively abut against a mechanical stop 250. The position of mechanical stop 250 relative to shank 252 can be set by a planting depth actuator assembly 254 (which may be manual or automatically controlled). Control arms 248 illustratively pivot around pivot point 256 so that, as planting depth actuator assembly 254 actuates to change the position of mechanical stop 250, the relative position of gauge wheels 216, relative to the double disc opener 214, changes, to change the depth at which seeds are planted.

In operation, row unit 102 travels generally in the direction indicated by arrow 260. The double disc opener 214 opens a furrow in the soil 238, and the depth of the furrow 262 is set by planting depth actuator assembly 254, which, itself, controls the offset between the lowest parts of gauge wheels 216 and disc opener 214. Seeds are dropped through seed tube 220, into the furrow 262 and closing wheels 218 close the soil.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It should also be noted that the different examples described herein can be combined in different ways. That is, parts of one or more examples can be combined with parts of one or more other examples. All of this is contemplated herein.

Example 1 is a towed agricultural implement, comprising:
an electrically powered component;
a generator, coupled to the electrically powered component, having a rotor and generating electrical power to power the electrically powered component;
a variable displacement hydraulic motor having a hydraulic fluid input that receives hydraulic fluid under pressure and an angular displacement drive mechanism coupled to drive the rotor of the generator, the variable displacement hydraulic motor driving rotation of the angular displacement drive mechanism; and
a displacement controller coupled to the variable displacement motor to control displacement of the variable displacement motor to vary torque exerted by the angular displacement drive mechanism on the rotor of the generator.

Example 2 is the towed agricultural implement of any or all previous examples wherein a speed at which the angular displacement drive mechanism rotates varies with flow of hydraulic fluid under pressure through the variable displacement hydraulic motor and further comprising:
a flow controller assembly configured to control flow of hydraulic fluid under pressure through the variable displacement motor based on a speed of rotation of the angular displacement drive mechanism.

Example 3 is the towed agricultural implement of any or all previous examples wherein the flow control assembly comprises:
a flow control valve that controls a flow rate of hydraulic fluid under pressure to the variable displacement hydraulic motor.

Example 4 is the towed agricultural implement of any or all previous examples wherein the flow control assembly comprises:
a flow controller configured to receive an indication of a speed of rotation of the angular displacement drive mechanism and an indication of a target speed and generate a control signal to control the flow control valve based on the speed of rotation of the angular displacement drive mechanism and the target speed.

Example 5 is the towed agricultural implement of any or all previous examples wherein the flow controller is configured to generate the control signal to control the flow control valve to maintain the speed of rotation of the angular displacement drive mechanism within a predefined range of the target speed.

Example 6 is the towed agricultural implement of any or all previous examples wherein the displacement controller is configured to receive an indication of a pressure of the hydraulic fluid under pressure at the hydraulic fluid input to the variable displacement hydraulic motor and to control the displacement of the variable displacement hydraulic motor based on the pressure of the hydraulic fluid under pressure at the hydraulic fluid input to the variable displacement hydraulic motor.

Example 7 is the towed agricultural implement of any or all previous examples wherein the variable displacement hydraulic motor includes a swashplate that is positioned to control the displacement of the variable displacement hydraulic motor, and further comprising:

a displacement control actuator coupled to the swashplate and controlled by the displacement controller to position the swashplate based on the pressure of the hydraulic fluid under pressure at the hydraulic fluid input to the variable displacement hydraulic motor.

Example 8 is the towed agricultural implement of any or all previous examples wherein the displacement control actuator comprises:
a displacement control valve; and
a swashplate actuator controlled by the displacement control valve.

Example 9 is the towed agricultural implement of any or all previous examples wherein the indication of the pressure comprises a pilot pressure coupled to the displacement control valve to control a valve position of the displacement control valve.

Example 10 is the towed agricultural implement of any or all previous examples wherein the towed agricultural implement comprises a row unit of a planter and wherein the electrically powered component comprises:
a seed metering system.

Example 11 is the towed agricultural implement of any or all previous examples wherein the towed agricultural implement comprises a row unit of a planter and wherein the electrically powered component comprises:
a seed delivery system.

Example 12 is an electrical power generation system that generates electrical power for an electrically powered component on a towed agricultural vehicle, the electrical power generation system comprising:
a generator, coupled to the electrically powered component, having a rotor and generating electrical power to power the electrically powered component;
a variable displacement hydraulic motor having a hydraulic fluid input that receives hydraulic fluid under pressure and an angular displacement drive mechanism coupled to drive the rotor of the generator, the variable displacement hydraulic motor driving rotation of the angular displacement drive mechanism, wherein a speed at which the angular displacement drive mechanism rotates varies with flow of hydraulic fluid under pressure through the variable displacement hydraulic motor;
a flow controller assembly configured to control flow of hydraulic fluid under pressure through the variable displacement motor based on a speed of rotation of the angular displacement drive mechanism; and
a displacement controller coupled to the variable displacement motor to control displacement of the variable displacement motor to vary torque exerted by the angular displacement drive mechanism on the rotor of the generator.

Example 13 is the electrical power generation system of any or all previous examples wherein the displacement controller is configured to receive an indication of a pressure of the hydraulic fluid under pressure at the hydraulic fluid input to the variable displacement hydraulic motor and to control the displacement of the variable displacement hydraulic motor based on the pressure of the hydraulic fluid under pressure at the hydraulic fluid input to the variable displacement hydraulic motor.

Example 14 is the electrical power generation system of any or all previous examples wherein the flow control assembly comprises:
a flow control valve that controls a flow rate of hydraulic fluid under pressure to the variable displacement hydraulic motor; and
a flow controller configured to receive an indication of a speed of rotation of the angular displacement drive mechanism and an indication of a target speed and generate a control signal to control the flow control valve based on the speed of rotation of the angular displacement drive mechanism and the target speed.

Example 15 is the electrical power generation system of any or all previous examples wherein the flow controller is configured to generate the control signal to control the flow control valve to maintain the speed of rotation of the angular displacement drive mechanism within a predefined range of the target speed.

Example 16 is the electrical power generation system of any or all previous examples wherein the variable displacement hydraulic motor includes a swashplate that is positioned to control the displacement of the variable displacement hydraulic motor, and further comprising:
a displacement control valve; and
a swashplate actuator controlled by the displacement control valve, the displacement control valve being controlled by the displacement controller to actuate the swashplate actuator to position the swashplate based on the pressure of the hydraulic fluid under pressure at the hydraulic fluid input to the variable displacement hydraulic motor.

Example 17 is a planter row unit, comprising:
a seed metering system;
a generator, coupled to the seed metering system, having a rotor and generating electrical power to power the seed metering system;
a variable displacement hydraulic motor having a hydraulic fluid input that receives hydraulic fluid under pressure and an angular displacement drive mechanism coupled to drive the rotor of the generator, the variable displacement hydraulic motor driving rotation of the angular displacement drive mechanism, wherein a speed at which the angular displacement drive mechanism rotates varies with flow of hydraulic fluid under pressure through the variable displacement hydraulic motor;
a flow controller assembly configured to control flow of hydraulic fluid under pressure through the variable displacement motor based on a speed of rotation of the angular displacement drive mechanism; and
a displacement controller coupled to the variable displacement motor to control displacement of the variable displacement motor to vary torque exerted by the angular displacement drive mechanism on the rotor of the generator.

Example 18 is the planter row unit of any or all previous examples wherein the displacement controller is configured to receive an indication of a pressure of the hydraulic fluid under pressure at the hydraulic fluid input to the variable displacement hydraulic motor and to control the displacement of the variable displacement hydraulic motor based on the pressure of the hydraulic fluid under pressure at the hydraulic fluid input to the variable displacement hydraulic motor.

Example 19 is the planter row unit of any or all previous examples wherein the flow control assembly comprises:
a flow control valve that controls a flow rate of hydraulic fluid under pressure to the variable displacement hydraulic motor; and
a flow controller configured to receive an indication of a speed of rotation of the angular displacement drive mechanism and an indication of a target speed and generate a control signal to control the flow control valve based on the speed of rotation of the angular displacement drive mechanism and the target speed.

Example 20 is the planter row unit of any or all previous examples wherein the variable displacement hydraulic motor includes a swashplate that is positioned to control the displacement of the variable displacement hydraulic motor, and further comprising:
 a displacement control valve; and
 a swashplate actuator controlled by the displacement control valve, the displacement control valve being controlled by the displacement controller to actuate the swashplate actuator to position the swashplate based on the pressure of the hydraulic fluid under pressure at the hydraulic fluid input to the variable displacement hydraulic motor.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A towed agricultural implement, comprising:
 an electrically powered component;
 a generator, coupled to the electrically powered component, having a rotor and generating electrical power to power the electrically powered component;
 a variable displacement hydraulic motor comprising:
  a hydraulic fluid input that is configured to receive hydraulic fluid under pressure from a hydraulic system of a towing vehicle that tows the towed agricultural implement; and
  an angular displacement drive mechanism coupled to drive the rotor of the generator, the variable displacement hydraulic motor driving rotation of the angular displacement drive mechanism; and
 a displacement controller coupled to the variable displacement motor to control displacement of the variable displacement motor to vary torque exerted by the angular displacement drive mechanism on the rotor of the generator.

2. The towed agricultural implement of claim 1 wherein a speed at which the angular displacement drive mechanism rotates varies with flow of hydraulic fluid under pressure through the variable displacement hydraulic motor and further comprising:
 a flow control assembly configured to control flow of hydraulic fluid under pressure through the variable displacement motor based on a speed of rotation of the angular displacement drive mechanism.

3. The towed agricultural implement of claim 2 wherein the flow control assembly comprises:
 a flow control valve that controls a flow rate of hydraulic fluid under pressure to the variable displacement hydraulic motor.

4. The towed agricultural implement of claim 3 wherein the flow control assembly comprises:
 a flow controller configured to receive an indication of a speed of rotation of the angular displacement drive mechanism and an indication of a target speed and generate a control signal to control the flow control valve based on the speed of rotation of the angular displacement drive mechanism and the target speed.

5. The towed agricultural implement of claim 4 wherein the flow controller is configured to generate the control signal to control the flow control valve to maintain the speed of rotation of the angular displacement drive mechanism within a predefined range of the target speed.

6. The towed agricultural implement of claim 1 wherein the displacement controller is configured to receive an indication of a pressure of the hydraulic fluid under pressure at the hydraulic fluid input to the variable displacement hydraulic motor and to control the displacement of the variable displacement hydraulic motor based on the pressure of the hydraulic fluid under pressure at the hydraulic fluid input to the variable displacement hydraulic motor.

7. The towed agricultural implement of claim 6 wherein the variable displacement hydraulic motor includes a swashplate that is positioned to control the displacement of the variable displacement hydraulic motor, and further comprising:
 a displacement control actuator coupled to the swashplate and controlled by the displacement controller to position the swashplate based on the pressure of the hydraulic fluid under pressure at the hydraulic fluid input to the variable displacement hydraulic motor.

8. The towed agricultural implement of claim 7 wherein the displacement control actuator comprises:
 a displacement control valve; and
 a swashplate actuator controlled by the displacement control valve.

9. The towed agricultural implement of claim 8 wherein the indication of the pressure comprises a pilot pressure coupled to the displacement control valve to control a valve position of the displacement control valve.

10. The towed agricultural implement of claim 1 wherein the towed agricultural implement comprises a row unit of a planter and wherein the electrically powered component comprises:
 a seed metering system.

11. The towed agricultural implement of claim 1 wherein the towed agricultural implement comprises a row unit of a planter and wherein the electrically powered component comprises:
 a seed delivery system.

12. An electrical power generation system that generates electrical power for an electrically powered component on a towed agricultural vehicle, the electrical power generation system comprising:
 a generator, coupled to the electrically powered component, having a rotor and generating electrical power to power the electrically powered component;
 a variable displacement hydraulic motor having a hydraulic fluid input that is configured to receive hydraulic fluid under pressure and an angular displacement drive mechanism coupled to drive the rotor of the generator, the variable displacement hydraulic motor driving rotation of the angular displacement drive mechanism; and
 a displacement controller coupled to the variable displacement motor to control displacement of the variable displacement motor to vary torque exerted by the angular displacement drive mechanism on the rotor of the generator, wherein the displacement controller is configured to receive an indication of a pressure of the hydraulic fluid under pressure at the hydraulic fluid input to the variable displacement hydraulic motor and to control the displacement of the variable displacement hydraulic motor based on the pressure of the hydraulic fluid under pressure at the hydraulic fluid input to the variable displacement hydraulic motor.

13. The electrical power generation system of claim 12 wherein the a speed at which the angular displacement drive mechanism rotates varies with flow of hydraulic fluid under pressure through the variable displacement hydraulic motor and the electrical power generation system further comprises:
a flow control assembly configured to control flow of hydraulic fluid under pressure through the variable displacement motor based on a speed of rotation of the angular displacement drive mechanism.

14. The electrical power generation system of claim 13 wherein the flow control assembly comprises:
a flow control valve that is configured to control a flow rate of hydraulic fluid under pressure to the variable displacement hydraulic motor; and
a flow controller configured to receive an indication of a speed of rotation of the angular displacement drive mechanism and an indication of a target speed and generate a control signal to control the flow control valve based on the speed of rotation of the angular displacement drive mechanism and the target speed.

15. The electrical power generation system of claim 14 wherein the flow controller is configured to generate the control signal to control the flow control valve to maintain the speed of rotation of the angular displacement drive mechanism within a predefined range of the target speed.

16. The electrical power generation system of claim 13 wherein the variable displacement hydraulic motor includes a swashplate that is positioned to control the displacement of the variable displacement hydraulic motor, and further comprising:
a displacement control valve; and
a swashplate actuator controlled by the displacement control valve, the displacement control valve being controlled by the displacement controller to actuate the swashplate actuator to position the swashplate based on the pressure of the hydraulic fluid under pressure at the hydraulic fluid input to the variable displacement hydraulic motor.

17. A planter row unit, comprising:
a seed metering system;
a generator, coupled to the seed metering system, having a rotor and generating electrical power to power the seed metering system;
a variable displacement hydraulic motor having a hydraulic fluid input that is configured to receive hydraulic fluid under pressure and an angular displacement drive mechanism coupled to drive the rotor of the generator, the variable displacement hydraulic motor driving rotation of the angular displacement drive mechanism, wherein a speed at which the angular displacement drive mechanism rotates varies with flow of hydraulic fluid under pressure through the variable displacement hydraulic motor;
a flow controller assembly configured to control flow of hydraulic fluid under pressure through the variable displacement motor based on a speed of rotation of the angular displacement drive mechanism; and
a displacement actuator, coupled to the variable displacement motor, and configured to actuate to control displacement of the variable displacement motor to vary torque exerted by the angular displacement drive mechanism on the rotor of the generator, based on a pressure of the hydraulic fluid received by the hydraulic fluid input.

18. The planter row unit of claim 17, and further comprising:
a displacement controller configured to receive an indication of the pressure of the hydraulic fluid under pressure at the hydraulic fluid input to the variable displacement hydraulic motor and to control actuation of the displacement actuator to control the displacement of the variable displacement hydraulic motor based on the pressure of the hydraulic fluid under pressure at the hydraulic fluid input to the variable displacement hydraulic motor.

19. The planter row unit of claim 18 wherein the flow control assembly comprises:
a flow control valve that controls a flow rate of hydraulic fluid under pressure to the variable displacement hydraulic motor; and
a flow controller configured to receive an indication of a speed of rotation of the angular displacement drive mechanism and an indication of a target speed and generate a control signal to control the flow control valve based on the speed of rotation of the angular displacement drive mechanism and the target speed.

20. The planter row unit of claim 19 wherein the variable displacement hydraulic motor includes a swashplate that is positioned to control the displacement of the variable displacement hydraulic motor, and further comprising:
a displacement control valve; and
wherein the displacement actuator comprises a swashplate actuator controlled by the displacement control valve, the displacement control valve being controlled by the displacement controller to actuate the swashplate actuator to position the swashplate based on the pressure of the hydraulic fluid under pressure at the hydraulic fluid input to the variable displacement hydraulic motor.

* * * * *